June 8, 1926.
W. F. HOLZHEUER
1,587,646
EXTRACTION PROCESS AND APPARATUS
Filed Sept. 28, 1925
4 Sheets-Sheet 1
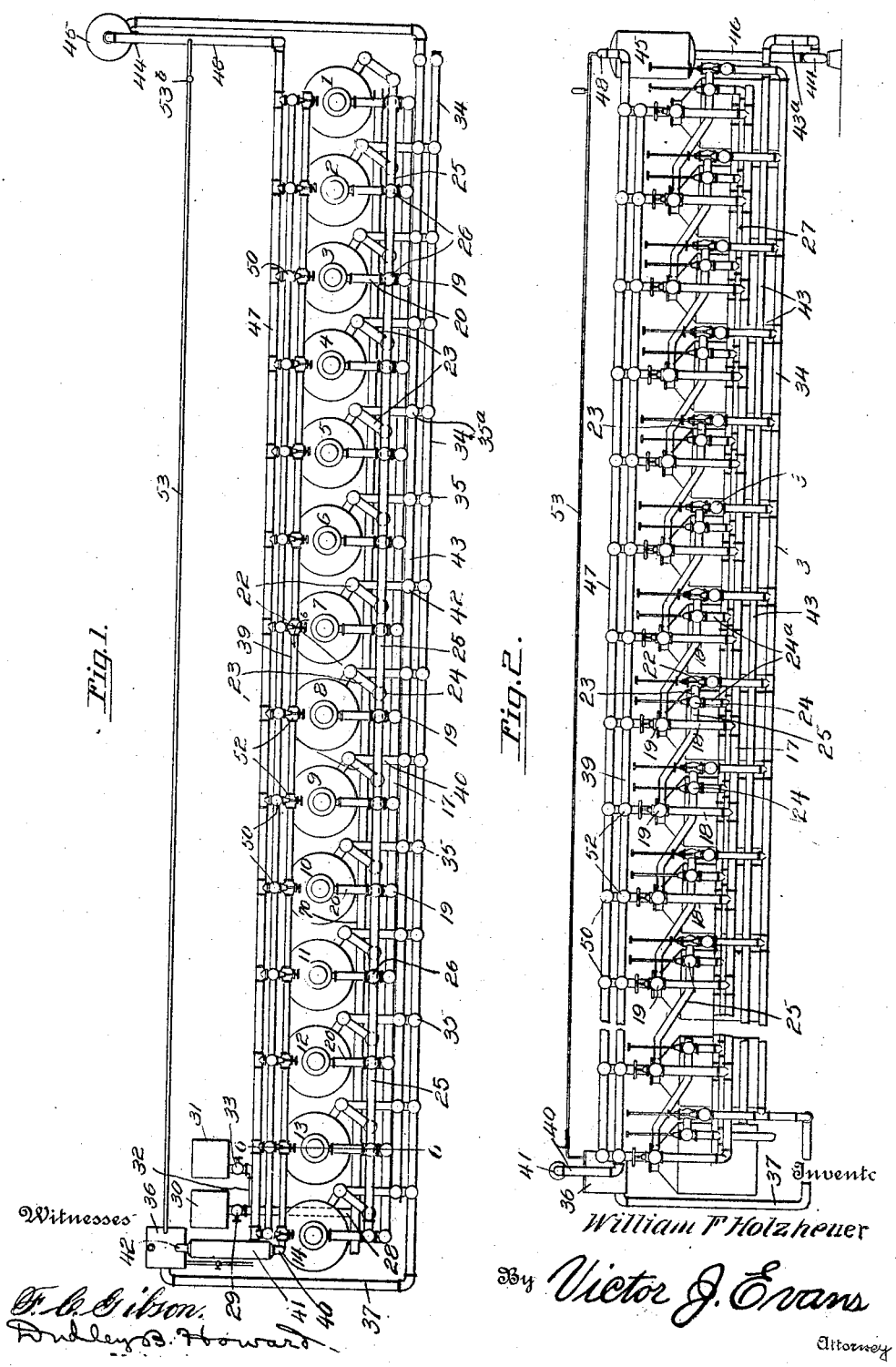

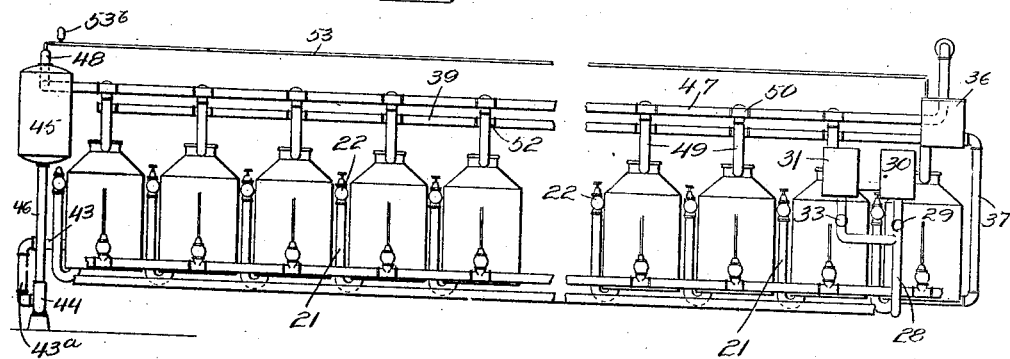
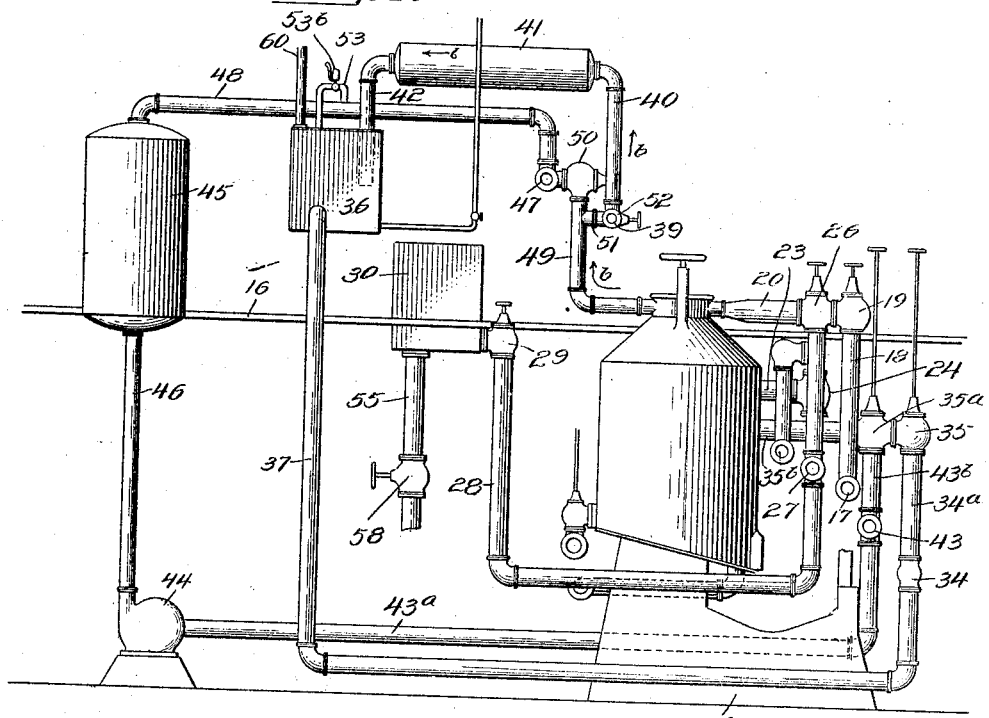

June 8, 1926.
W. F. HOLZHEUER
1,587,646
EXTRACTION PROCESS AND APPARATUS
Filed Sept. 28, 1925
4 Sheets-Sheet 4
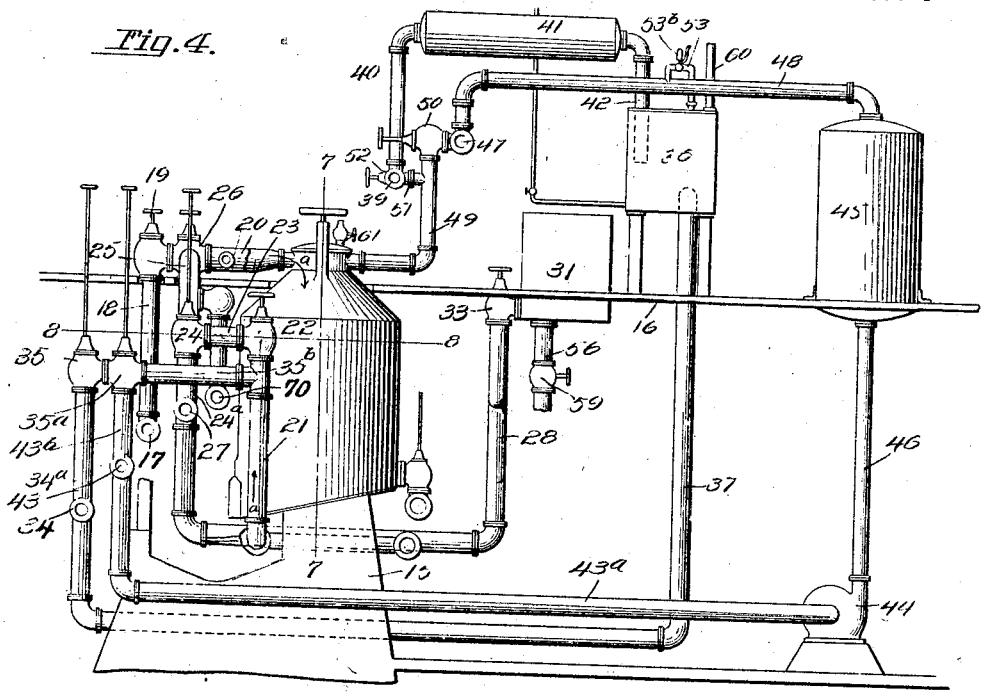
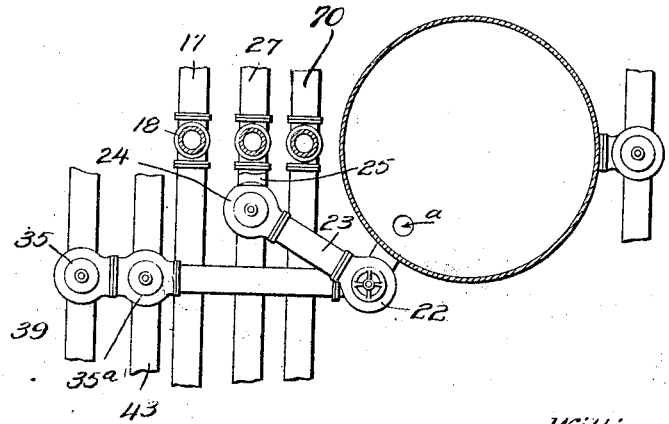
Inventor
William F. Holzheuer
Witnesses
F. C. Gilson
Dudley B. Howard
By Victor J. Evans
Attorney Patented June 8, 1926.

1,587,646

UNITED STATES PATENT OFFICE.

WILLIAM FREDERICK HOLZHEUER, OF HALE, MICHIGAN.

EXTRACTION PROCESS AND APPARATUS.

Application filed September 28, 1925. Serial No. 59,247.

My invention relates to an apparatus and process for the extraction or diffusion of the sugar content from saccharine bodies, such as sugar beet cuttings in particular.

In the process in use at the present time for extracting sugar from the sugar beet, the finely sliced beets, or cossettes, are loaded into a series of diffusion cells connected with each other through various pipe connections to form a battery, and water is circulated from cell to cell along this battery to diffuse the sugar content from the cossettes into the water which becomes rich in sugar as it proceeds by circulation along the length of the battery. This water is supplied under moderate pressure at the point where it enters the battery, the pressure being produced either by gravity or by some mechanical means, the specific mode being immaterial. The piping between the cells is so arranged that the course of the water is downward through each cell and upward through the calorisators which are usually interposed in the pipe connecting leading from the bottom of one cell to the top of the next cell.

Though the number of cells in series forming the battery, may vary, and the size of these cells may vary both in height and diameter, nevertheless a typical example might be described as constituting about fourteen cells, the diameter of each cell being about five ft., and the height about ten ft.

Though the exhausted cossettes are usually being dumped from one cell, while another cell is being filled, and still another cell undergoing the "mashing" operation, thus accounting for a total of three cells engaged in these special operations, nevertheless the remaining cells, i. e. approximately eleven cells, are connected in the series circulation of the water which gradually becomes a rich sugar juice, as above described.

Because of the fact that each of the eleven cells in this circulation are loaded full with comparatively fine beet cuttings, or cossettes, which are packed into the cell quite tightly, it is obvious that the resistance to the flow of the water along the length of the battery, and through cell after cell, is quite large, and this rate of flow, which is commonly referred to as the "circulation", is greatly retarded on account of this very considerable resistance set up by the cossettes in each cell. However, in order to maintain good efficiency in this diffusion process it is essential, for various reasons, to keep this rate of circulation as high as possible. Various benefits accrue if this circulation is fast, and conversely various detriments are encountered if the circulation is slow. In addition the faster the circulation the greater the capacity or total daily tonnage of cossettes that can be handled with a given amount of this diffusion battery equipment, and since many beet sugar factories find their diffusion is the slow point in their entire factory operation, their efforts are naturally interested in any improvement that will speed up the battery circulation, and thereby increase the hourly tonnage that can be handled by their battery, as such increase will immediately release the additional capacity that they have in the other machines and stations of the factory so that the hourly tonnage or capacity of the entire factory can be increased by exactly the amount that the diffusion battery can be increased. This overall increase of the total factory capacity is of utmost importance, as the investment in all the machinery in a beet sugar factory, even outside the diffusion battery, is exceedingly large financially.

One obvious limitation against high rate of circulation in the ordinary battery operated in the usual manner, arises from the fact that the water pressure, at the point where the water enters the battery, can only be raised to a moderate amount, because if it is raised above a certain point, its downward force or flow in the first few cells is so great as to draw the entire charge of cossettes in those cells downward forcibly against the bottom of these cells, and packs these cossettes so tightly onto the bottom that they act more or less in the nature of a large valve and practically close off the flow completely, so that in place of increasing the rate of circulation by virtue of increasing the initial water pressure, just the reverse results are obtained. In order to hold the cossettes up and prevent them from packing so tightly onto the bottom of the cell as just described, various expedients such as large quantities of chains hung transversely across the cells at various elevations therein, have been resorted to, with a fair degree of success, but the number of chains that can thus be hung in the cells is limited by the fact that if any excess of chains are used it becomes very difficult to load the original cossettes into the cells, and it also becomes difficult to dump the spent cossettes out of the cells, and the time lost by increased difficulty from these causes offsets the benefit of increased rate of circulation. In other words the benefit derived by using chains to support the cossettes within the cells, so that a somewhat higher initial water pressure can be used in order to speed up the circulation, is limited, and those factories where this expedient has been increased to the limit of its usefulness, often, for various reasons, find themselves desirous of still further increasing their rate of battery circulation, but find it impossible to do this by any process or means heretofore at their disposal.

The principal object and benefits of the arrangement and new process of operating the battery, which I will hereinafter describe, is directed toward effectively increasing the battery circulation in a very substantial manner, this increase being gained over the best rates of circulation heretofore produced. Briefly my arrangement and process includes a modification of the ordinary piping connecting the various cells, and including a series of valves, and proper headers, so that after the water or juice has flowed approximately through half the cells under the force of the initial pressure, it is brought through one of the headers to a booster pump where its pressure is raised back to approximately the same amount as the original pressure at which the water entered the first cell, and with this boosted pressure it flows back thru another header where the valves are so set that it enters the next cell in the series and flows much more rapidly through the remainder of the battery because of the increased pressure which it receives by passage through the booster pump. By thus cutting into the battery part way along its length, and boosting the pressure as just described, the total overall flow or circulation through the entire battery can be considerably increased over any previous method of operation, without introducing any detrimental features, and as above described this increased rate of circulation is of utmost value in a great many sugar factories. In considering this subject from the standpoint of the actual mode of operating the battery it is of course realized that all diffusion batteries are operated with a definite sequence of operations progressing from cell to cell around the battery as the work proceeds. For instance though a particular cell may be dumped at a given time, and another cell being filled at the same time, nevertheless a few moments later it will be a neighboring cell that is being dumped, and still another cell that is being filled, and so on these operations proceed progressively from one cell to the next in the entire series all around the battery. In similar manner the initial water which enters the battery is at one time entering one cell and at another time another cell, and so on all around the battery in the same sequence with the other steps. Likewise therefore the particular cells in the series from which the juice is drawn off to the booster pump for the purpose of boosting the pressure and reinjecting into the series as above described, also changes from cell to cell along with the sequence of all the other steps of the operation. This will become clear from the detailed explanation of the apparatus in a subsequent part of this specification.

Should it be found that merely boosting the pressure at one point in the battery is not sufficient, my invention contemplates that the pressure can be boosted back approximately to initial pressure at two, three or more points, the modification of the apparatus for this purpose being fairly obvious.

In order to put my invention into effect, one convenient mode of arranging the apparatus is illustrated in the accompanying drawings.

Fig. 1 is a top plan view of a battery of fourteen cells arranged in a straight line system;

Figure 2 is a front elevation of the same;

Figure 3 is a rear elevation thereof;

Figure 4 is a side elevation;

Figure 5 is a side elevation looking in the opposite direction to Figure 4;

Figure 8 is a horizontal longitudinal sectional view on line 8—8 of Figure 4.

Figure 6:
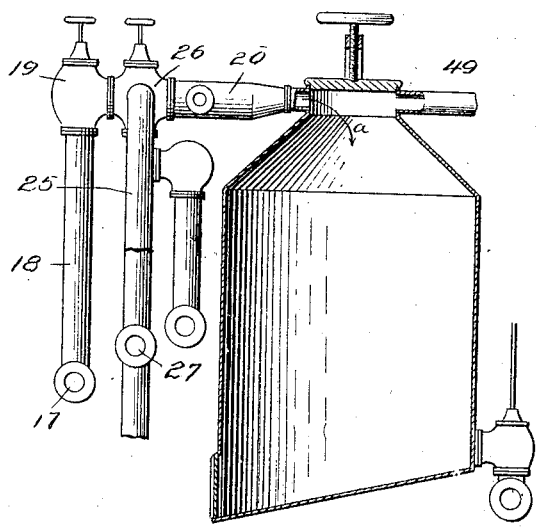
Figure 6 is a transverse sectional view taken on line 6—6 of Figure 1.

In the several views of the drawing, I have shown a battery of diffusion cells, which, to aid in the description, are numbered from 1 to 14 consecutively, and which are arranged in a straight line, although it is of course understood that the cells may be arranged in a curve, circle, rectangle, or in any other desired manner.

Figure 7:
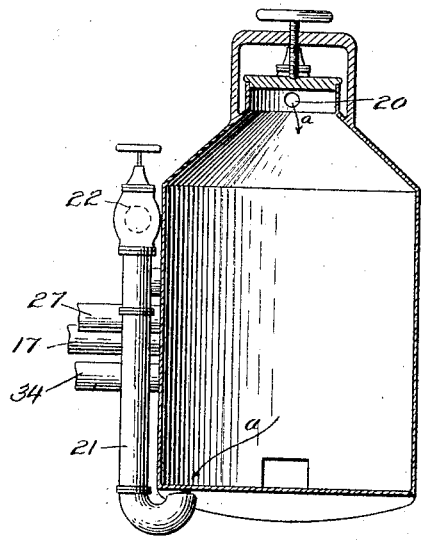
Figure 7 is a similar sectional view taken longitudinally through a portion of the apparatus.

These diffusion cells are preferably mounted on a suitable foundation 15, beneath the operator's platform 16, with their upper ends protruding through suitable apertures in said platform. A longitudinally extending water header 17, which supplies the fresh water under moderate pressure, from a source not shown, is connected with the upper ends of the respective cells by means of the pipe 18, the adjustable hand valve 19, the two-way valve 26, and the pipe 20, there being one of each of these parts in the connection leading from this water header 17 to the top of each of the cells. As is best indicated in Figures 3, 4 and 7, a pipe 21 leads from the lower end of each diffusion cell up to a valve 22, and if desired this vertical pipe 21 can be arranged in the manner of a calorisator for heating the juice as it comes from the bottom of one cell upward through this pipe on its passage to the next cell.

As best indicated in Figures 1 and 4, a pipe 23 connects this valve 22 with a two-way valve 24, from which the branch pipes 24ª and 25 extend, the former being connected with a longitudinally extending header 27, which leads to a measuring tank as hereinafter described, and the pipe 25, best shown in Figures 1, 2 and 4 being connected with the two-way valve 26 of the next succeeding cell.

The header 27 is connected at one end with the measuring tank 30, see Figure 5, by means of a pipe 28 and the valve 29 located adjacent to the tank. A second measuring tank 31, see Figures 1 and 4, is connected with the pipe 28 by means of a branch pipe 32 and a valve 33.

Another longitudinally extending header 34, best seen in Figures 1, 2, 4 and 5, is connected at each cell by means of a pipe 34ª, valve 35, the two-way valve 35ª, and pipe 35ᵇ, with the vertically rising pipe 21, previously described. If desired a storage tank 36, see Figure 4, for receiving sweetwater can be mounted on platform 16 near the end of the battery where the measuring tanks 30 and 31 are located, and this tank 36 can be connected with the adjacent end of header 34 by means of a pipe 37 communicating with the bottom of the tank.

In this case a longitudinal header 39 can be disposed above the diffusion cells, see Figure 4, and this header 39 is at each cell provided with a valve 52 which communicates through a branch pipe 51, with the pipe 49 that enters the upper end of each cell. The end of header 39 connects with pipe 40, heater 41, and pipe 42, leading to the upper end of the storage tank 36.

In cases where the storage tank 36 is not used, the header 39 and pipes 40, 41, 42, and 37 may be omitted, their points of connection with pipes 49 and header 34, Figure 4, being of course closed or sealed by means of a proper cap or closing flange.

As is nicely indicated in Figure 4, aided by Figure 2, each of the vertical pipes 49 leading from the upper ends of the respective cells, is connected through a valve 50 with another longitudinally extending header 47, which may be described as the high pressure side of the booster header, as the end of this header is connected by means of pipe 48, heater 45, and pipe 46, with the discharge or high pressure side of the booster pump 44, which is used to boost the pressure in order to speed up the battery circulation in the manner indicated in a former part of this specification.

The heater 45 may, or may not be used, according as suits the taste of the designer. Also I have shown the booster pump 44 as represented by a centrifugal pump, but any other kind of a pump can of course be used, or in fact any means or arrangement for increasing pressure can be used, it being understood that the pump which I have shown is intended to be broadly representative of any pressure boosting, or pressure raising mechanism or arrangement that is suitable for this purpose. In this connection it might be noted that the above mentioned heaters or calorisators arranged in the pipe connections between the cells, perhaps have an exceedingly small effect on the pressure of the fluid because of the exceedingly small expansion that results from the heating effect of the calorisators, but obviously the pressure change due to this cause is so small as to be utterly negligible so far as practical operations are concerned. In fact it is impossible to measure or notice this change of pressure due to the calorisators, on any of the pressure gauges ordinarily used on these diffusion batteries. Therefore this negligible and infinitesimally small change of pressure due to the calorisators, is entirely disregarded and is not embraced within the term "boosting the pressure," etc., as used in this application.

The low pressure side of the pump or pressure boosting means 44 is connected through pipe 43ª to the adjacent end of another longitudinally extending header 43, which latter is connected by means of pipes 43ᵇ with the two-way valves 35ª from which the connection leads through pipes 35ᵇ and 21 to the bottom of each cell.

For obvious reasons this header 43 may be termed the low pressure header as it is the one from which the juice is drawn from one of the cells approximately in the center of the circulation, and led to the booster pump for boosting the pressure on the juice before same is passed back along header 47 and injected into the next cell following the one from which it is drawn into the header 43. In regard to the high pressure header 47, it is of course understood that all of the valves 50 leading from the respective cells, excepting one, are closed, and likewise that all of the valves 35ª leading from the respective cells to the low pressure booster header 43, excepting one, are closed, and that in this way through the one valve 35ª which is open, the juice is drawn from that particular cell through the header 43 into the suction side of the pump where its pressure is boosted by the pump and passed back into the high pressure header 47 where it passes through the one valve 50 which is open, into the next cell in the series.

As the operations progress along the battery from cell to cell, the one valve 35ª, and the one valve 50, which is open, is progressively changed from cell to cell along the battery as the operations progress, so that it is seen that the particular point in the battery at which this boosting is done progresses along the length of the battery in keeping with the other steps in the battery operations.

If it is desired to reduce the cost of installing this pressure boosting portion of the process it can be done by omitting the pipes 49 and the two-way valve 35ª from every other cell, or in fact even two of the sets of valves and parts can be omitted out of every three, which will reduce the cost of installation very substantially, and satisfactory results in increasing the speed of battery circulation can still be obtained even though the booster pump or pressure raising means can only be cut into the battery at every second or every third cell, which point however can still be selected approximately midway along the length of the entire circulation, or at any other point which the operator prefers.

In order to complete the description of the piping shown, the following remarks may be helpful.

If the sweetwater tank 36, and its other connected parts, are used, an emergency discharged pipe 53 may be installed for connecting pipe 48 of the pressure boosting circuit with the upper end of the storage tank 36, the connection through this pipe 53 being cut off however by means of a safety valve 53ᵇ, which is normally closed to prevent circulation through pipe 53, but which opens to relieve any excessive pressure that may for any reason be built up in the high pressure portion of the booster system. A pipe 60 may also be connected with the upper end of storage tank 36, this pipe 60 being suitably connected so as to collect sweetwater that may accumulate at other stations or places of operation in the beet sugar factory.

Also outlet pipes 55 and 56, Figures 4 and 5, connect the measuring tanks 30 and 31 respectively with the carbonation apparatus of the sugar plant, (not shown), and these pipes are provided with valves 58 and 59.

Header 70, shown in Figs. 1, 4 and 8, is an accessory pipe that is used in various ways by those accustomed to operate these diffusion batteries.

The foregoing description concludes the essential portions of the piping and other apparatus in a diffusion battery arranged to be operated on my pressure boosting system, and I will now describe the manner of setting the valves for a few of the important steps in the operation, it being understood that these settings progress from point to point, and cell to cell along the battery as the operation continues.

Assuming that the battery is in full operation and the work progressing normally, it is realized that water under an initial pressure head will be entering one of the cells, this being the starting point in the circulation. As a matter of fact this fresh water usually enters the cell in which the cossettes are most exhausted of their sugar content. On this particular cell the valves will be set as follows: Valve 19 will be open; the two-way valve 26 will be set so as to connect valve 19 with pipe 20, and so as to cut off the pipe 25 rising diagonally and eventually connecting with the bottom of the preceding cell. Obviously this will permit the fresh water from header 17 to pass through pipe 18, valve 19, two-way valve 26, and pipe 20 into the cell at the top, from whence the circulation proceeds downward through this cell and upward through the pipe or calorisator 21 connected to the bottom of this cell, and from this pipe 21 the juice passes up through valve 22, branch pipe 23, two-way valve 24 and pipe 25 into the two-way valve 26 of the next following cell. In the portion of the piping just mentioned, the two-way valve 35ª, Figure 4, is closed against the branch pipe 35ᵇ, valve 22 is open, the two-way valve 24 is open to pipe 25, but closed to pipe 24ª, and the two-way valve 26 in the next succeeding cell is open so as to connect the circulation from pipe 25 through pipe 20 into the next cell. From this next cell through which the circulation is downward, the juice again rises upward through the pipe or calorisator 21 and into the top of the next cell in the same manner as just described, the setting of the valves being identical. In similar manner the circulation proceeds from cell to cell, always being downward through each cell, and upward through the intervening piping to the next cell. The fresh water which was introduced into the cell having the most exhausted cossettes, gradually becomes richer in sugar as it diffuses the sugar by osmosis from the cossettes into the juice, this enrichening of the juice proceeding cumulatively from cell to cell until the richest juice after passing over the last cell, in which the new and richest cossettes are found, leaves the battery and proceeds to the measuring tanks 30 and 31, by a setting of the valves which will presently be described.

As previously described, at a point in the circulation roughly midway along its length, or at any other desired point, between the cells where the fresh water is admitted and the richest juice is discharged to the measuring tank, the juice is taken out of the system to the pressure boosting arrangement described, where its pressure is boosted and the juice again enters circulation in the cell approximately next to the one from which it was taken out, and in this way the speed of circulation throughout the entire battery is substantially increased, with very large benefits of a character that are well understood by those skilled in the operation of these diffusion batteries. The setting of the valves for accomplishing this boosting of the pressure at a desired point along the battery, has previously been described in detail.

The setting of the valves on the last cell in the battery, where the rich juices are being led to the measuring tank 31 for ultimate discharge from the battery, are as follows: The valve 22, Figure 4, is open, and the two-way valve 24 is closed against pipe 25, but open to pipe 24$^a$ so as to allow the juice to flow down through pipe 24$^a$ into header 27, and along same into pipe 28, from which it flows either into tank 30 or 31, according as to whether the valve 29 or 33 is open. At this time the two-way valve 35$^a$ is of course closed against pipe 35$^b$.

The headers and parts 34, 34$^a$, 35, 36, 37, 39, 40, 41, 42 and 52, all of which have been previously described, can be used under the following circumstances. Assuming that a cell beyond the one into which the boosted pressure is admitted, is plugged, i. e. the cossettes have plugged the bottom exit port from the cell, the tendency to do this being noticeable with bad or frozen beets, and being induced by the normal downward current of the fluid through the cossettes in the cell. Such a plug, is of course undesirable and should be removed. To remove same with the above mentioned equipment, the valve 52 corresponding with and adjacent to the open valve 50, is also opened somewhat, so that some of the high pressure juice from the high pressure header 47, will flow through pipes 40, 41, tank 36, pipe 37, header 34, pipe 34$^a$ and into the bottom of the plugged cell by properly operating the following valves corresponding to that cell. The valve 35 is opened, the two-way valve 35$^a$ is closed against the pipe 43$^b$ and opens valve 35 into pipe 35$^b$, from which the fluid momentarily flows downward through pipe 21 and enters the bottom of the plugged cell, the valve 22 of course being closed to permit this action. This momentary counterflow down through pipe 21 into the bottom of the cell, has a tendency to lift and agitate the cossettes that are plugging the circulation, and as soon as this plugging action is relieved, the valves are all returned to their normal operating position, and the circulation and diffusion operation continues in its normal manner.

For certain other detailed steps in the operation which may at special times be desired, the various valves shown and indicated may be manipulated to produce same, but these various details of operation have nothing to do with the pressure boosting features which constitute one of the principal parts of my invention, and being well understood by those skilled in battery operations, same need not be further described herein.

In conclusion, I wish to point out that the art of drawing the juice out at a point part way along the length of the circulation, at a place which can be changed from time to time as the operation proceeds, and then after boosting the pressure of this juice, reinjecting same at an adjacent or subsequent point in the circulation, as hereinbefore described, is basically new and pioneer, so far as I am aware, and that I broadly am the inventor thereof, and of the very substantial benefits both from diffusion efficiency and increased battery and factory capacity that may be obtained thereby.

As one of the benefits derived from my boosted circulation pressure, and not previously mentioned, I call attention to the fact that there is sufficient pressure to both draw juice from the last cell into the measuring tanks, and also to force juice from this last cell up through the next cell of fresh cossettes which are being mashed. In the ordinary mode of operating a diffusion battery without my boosted pressure, it is very difficult, or impossible, to obtain enough pressure at the end of the battery to both draw and mash at the same time, and for this reason these operations are usually performed one after the other, which has a further effect in slowing down the battery, and results in a benefit derived by my boosted pressure as batteries equipped with same are capable both of drawing and mashing simultaneously, and this of course speeds up the overall circulation further.

Though I have described my invention as used in the process of manufacturing sugar, nevertheless both the process and apparatus described herein has application in other arts and industries wherever it is desired to extract into a liquor a desired ingredient from a substance loaded into a diffusion battery. In the sugar industry the liquor consists of water which gradually becomes rich in sugar as it circulates along the length of the battery; the desired ingredient is the sugar; and the substance loaded into the diffusion battery is the beet cuttings or cossettes as hereinbefore described; but in other arts or industries the liquor, the desired ingredient, and the original substance, together with other substances that may be present, may all be different from those in the sugar industry, but my invention is useful and applicable nevertheless, and I claim it in respect to those other arts and industries as well as for the sugar industry.

Also various modifications of my apparatus and process will be apparent, but these are all broadly included within the scope of the appended claims.

I claim:

1. The process of extracting into liquor a desired ingredient from a substance loaded into a diffusion battery, said process consisting of circulating the liquor under an initial pressure progressively through a series of cells constituting the battery and containing the original substance, and boosting the circulation pressure of said liquor at a place intermediate of the ends of said battery by passing said liquor through a pressure boosting means provided for this purpose, substantially as described.

2. The process of extracting into liquor a desired ingredient from a substance loaded into a diffusion battery, said process consisting of circulating the liquor progressively through a series of cells constituting the battery and containing the original substance, and boosting the circulation pressure of said liquor at a place intermediate of the ends of said battery by interposing a pressure boosting means in the circulation at a place where the liquor passes from one of the cells into another of the cells in the series, substantially as described.

3. The process of extracting into liquor a desired ingredient from a substance loaded into a diffusion battery, consisting of circulating the liquor progressively through a series of cells constituting the battery and containing the original substance, and boosting the circulation pressure of said liquor at a place intermediate of the ends of said battery by interposing a pressure boosting means in the circulation at a place where the liquor passes from one cell into another cell in the series, the particular cells between which the pressure boosting means is interposed being changed progressively along the battery as the other steps in the extracting process proceed along the battery, substantially as described.

4. An apparatus for carrying out my herein described process, consisting of a diffusion battery having a number of cells in series, said cells being connected with each other through valves and piping so that a fluid introduced into said series of cells can circulate progressively from one cell to another along the battery, and means for boosting the circulation pressure of said fluid at a point along its course through the battery, consisting of a low pressure header connected with various of said cells through separate valves, and a high pressure header also connected to various of said cells through separate valves, said low and high pressure headers being connected to each other through a pressure boosting means, one of said valves connecting one of said cells with said low pressure header being open, while one of said valves connecting another of said cells with the high pressure header is open to cause said fluid to pass from one cell through said pressure boosting means and back into another cell at a higher pressure, substantially as described.

In testimony whereof, I affix my signature.

WILLIAM FREDERICK HOLZHEUER.